No. 794,754. PATENTED JULY 18, 1905.
W. V. TURNER & D. M. LEWIS.
ENGINEER'S BRAKE VALVE ATTACHMENT.
APPLICATION FILED APR. 1, 1903.
2 SHEETS—SHEET 2.
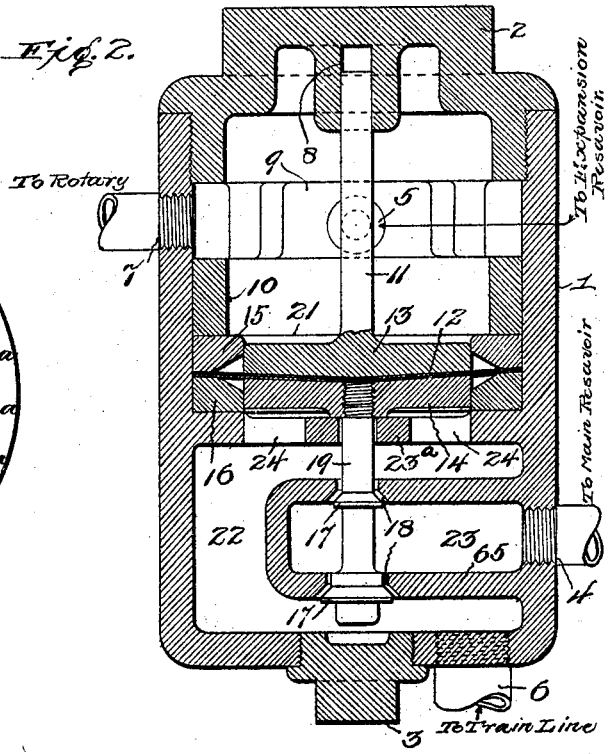
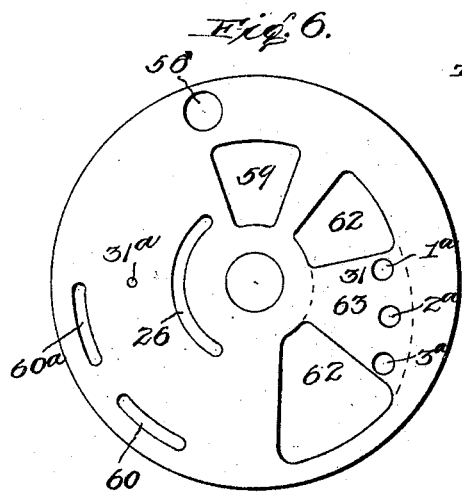
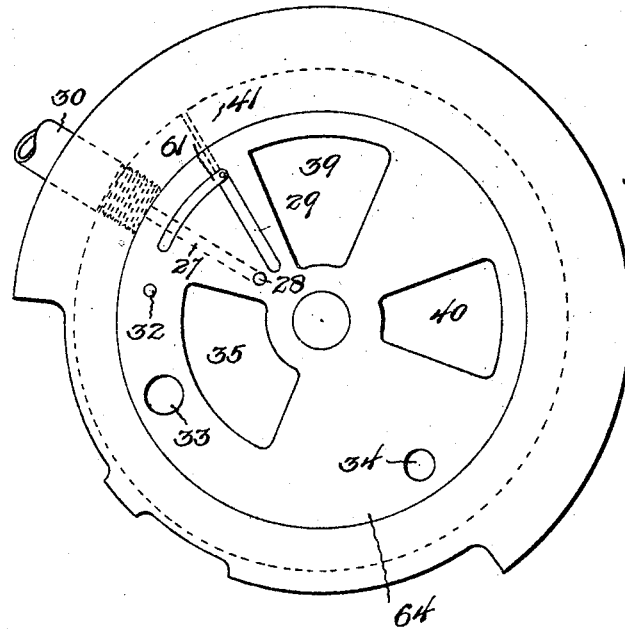
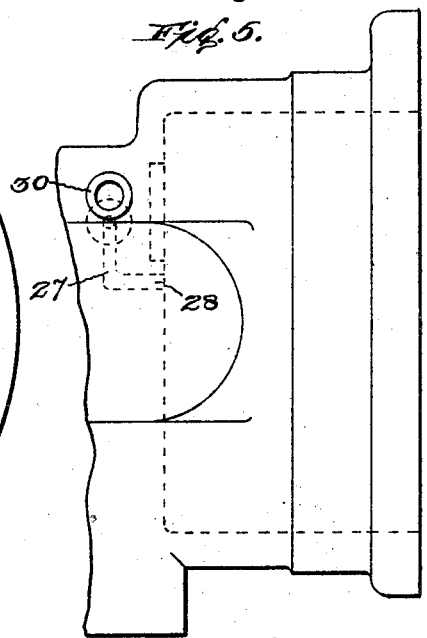
Witnesses
T. L. Hockage
P. W. Birckhead
Inventors,
Walter V. Turner &
David M. Lewis
by Howson & Howson
Attorneys No. 794,754. Patented July 18, 1905.

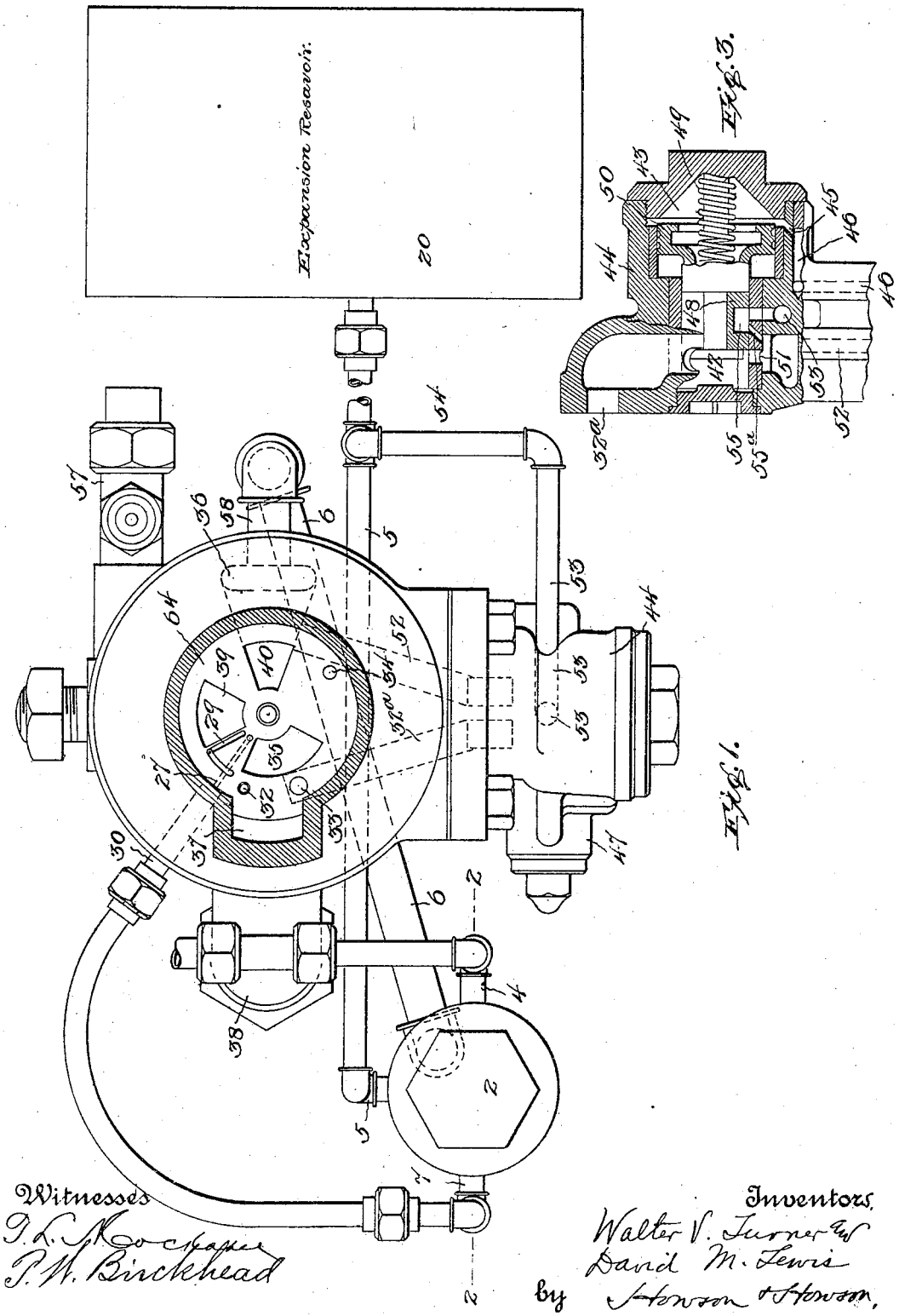

UNITED STATES PATENT OFFICE.

WALTER V. TURNER, OF TOPEKA, KANSAS, AND DAVID M. LEWIS, OF RATON, TERRITORY OF NEW MEXICO, ASSIGNORS TO THE WESTINGHOUSE AIR BRAKE COMPANY, OF PITTSBURG, PENNSYLVANIA, A CORPORATION OF PENNSYLVANIA.

ENGINEER'S BRAKE-VALVE ATTACHMENT.

SPECIFICATION forming part of Letters Patent No. 794,754, dated July 18, 1905.

Application filed April 1, 1903. Serial No. 150,622.

*To all whom it may concern:*

Be it known that we, WALTER V. TURNER, a resident of Topeka, Shawnee county, State of Kansas, and DAVID M. LEWIS, a resident of Raton, Colfax county, Territory of New Mexico, citizens of the United States, have invented certain new and useful Improvements in Engineers' Brake-Valve Attachments, of which the following is a specification.

Our invention relates to engineer's brake-valves for operating automatic fluid-pressure railway-brakes, and more particularly to attachments for such valves whereby the desired reduction in train-pipe pressure may be always maintained notwithstanding any leakage that may occur in the train-line and whereby considerable saving is effected in the amount of air used, because the release and reapplication usually necessary for effecting the desired braking effect on account of such leakage in the train-line are entirely obviated.

It is well known that under the present practice it is often found that the brakes are applied harder than intended because of the reduction in the train-line due to leakage below that desired for the particular application, and hence several reapplications are necessary to maintain the desired braking effect, the result of which causes first a slowing down, then a surge forward, and then a slowing down, and often causing a break in two, with resulting damage to cars and equipment.

By our invention we provide an attachment for engineer's brake-valves which will maintain the train-pipe pressure constant at the desired degree of reduction for the particular intended application of the brakes and will obviate any necessity of release, recharging of auxiliary reservoirs, and reapplication to secure the proper braking effect.

With these objects in view our invention consists, broadly, in the provision, in connection with the main reservoir and engineer's brake-valve mechanism, of means controlled by the pressure in the train pipe or line while the engineer's valve is on lap for admitting main-reservoir pressure directly to the train-line when the regulated pressure in said train-line reduces below that desired to be held therein for any desired application, and further consists in the combination, with such engineer's brake-valve mechanism and main reservoir, of a supplementary chamber or casing containing a movable abutment exposed to the pressure of a regulating-chamber on one side controlled through the engineer's brake-valve mechanism and to direct train-line pressure on the other side, with a conduit connecting the main reservoir with the train-line having a valve therein adapted to be governed by the movable abutment to admit fluid under pressure from the main reservoir to the train-line when the pressure is reduced below a regulated amount in the latter while the engineer's valve is on lap; and our invention further consists in the novel construction and combination of parts, as hereinafter described, with reference to the accompanying drawings, and more particularly pointed out in the claims.

In the drawings, Figure 1 is a plan view of our invention applied to a Westinghouse engineer's brake-valve structure with the rotary valve removed. Fig. 2 is a central longitudinal section on the line 2 2, Fig. 1. Fig. 3 is a sectional detail of the application feed-valve, showing the changes therein to adapt our invention to the same. Fig. 4 is a top plan view of the rotary seat of the engineer's valve. Fig. 5 is a side elevation thereof, and Fig. 6 is a bottom plan view of the rotary valve of the engineer's brake-valve.

Referring to the drawings, in which the same reference characters relate to the same or corresponding parts in all the views, we will first briefly indicate the well-known parts of the engineer's brake-valve sufficiently to fully illustrate the application of our invention thereto and to show the changes made therein in order to adapt our invention to the same.

Our invention is shown applied to the well-known Westinghouse engineer's valve—such, for example, as that shown in Patent No. 557,463, granted to George Westinghouse, Jr., March 31, 1896, and Patent No. 561,949, granted to H. H. Westinghouse and T. W. Welsh June 9, 1896, with feed-valve attachment connected in the same manner as the said attachments in said patents and operating with the same effect, but embodying the slide-valve feed-valve illustrated in the *Westinghouse Air Brake Instruction Book*, edition of 1902, Plates 7, 8, 9, and 10.

The numeral 64 indicates the rotary seat, which is provided with the usual preliminary exhaust-port 32 and groove or cavity 61, the latter of which instead of leading into the direct application and exhaust port 39 communicates, by means of a port or passage 41, with the atmosphere direct. The feed-port, 33 is connected by a passage $32^a$ with the chamber 42 of the application feed-valve structure 44, while 34 is the equalizing-port, which communicates at the proper time with the chamber above the equalizing-piston, (not shown,) and the cavity 35 in the rotary seat affords the usual passage for the main-reservoir pressure to the train-line by way of the port 36, with which said cavity communicates when the brake-valve is in release, the latter port 36 communicating with the train-line, as usual. The port 37 connects the main reservoir with the upper part of the brake-valve above the rotary valve, and the pipe 38 leads to the main reservoir.

The numeral 39 indicates the "direct application and exhaust" port, and 40 the "direct application and supply" port. The passage $32^a$ connects the chamber 42 of the feed-valve structure 44 with the feed-port 33 in the rotary seat, so that in running position the main-reservoir pressure has free access to the chamber 42 through the passage $32^a$. In the feed-valve structure 44 is the Westinghouse standard supply-piston chamber 43, in which operates the supply-piston 50 under pressure of the spring 49, and such chamber 43, communicating, through a port 45, with the train-pipe, through the passage 46, by way of the regulating-valve 47 in the usual way, through the passage 52.

The slide-valve 48 is of the usual type (illustrated in the *Westinghouse Instruction Book* hereinbefore mentioned) and remains open in the position shown so long as the pressure of fluid passing through the feed-valve does not exceed that for which the regulating-valve is set—say seventy pounds. One branch of the passage 52 connects, by means of the port 51, the diaphragm-chamber (not shown) of the regulating-valve with the chamber 42 and the other with the train pipe or line, such connection being on the same side of the diaphragm as that of the passage 46, so that the pressure for which the regulating-valve is set will flow to the train-line from the brake-valve through the feed-valve, and the latter will be closed when seventy pounds pressure accummulates on the diaphragm, (not shown,) since the regulating-spring is set to be compressed at this pressure, thereby seating the regulating-valve, thus preventing the leakage around the piston 50 from passing through the train-line, and hence equalization takes place on both sides of the said piston 50, and the spring 49, previously compressed by the relatively high pressure in the chamber 42, now forces the supply-valve 48 to its normal position, closing the port 51, as usual in this type of valve structure, thereby maintaining the train-pipe pressure at the regulated amount while the brake-valve is in running position. In the rotary valve is the usual port 56, which is adapted to register with the port 32 in release and with the port 33 in running position, while the brake-valve is connected with the equalizing-reservoir by the pipe 57, and the supply-port 59 in the rotary valve performs its usual function.

The numeral 62 indicates the open ends of the large cavity in the under side of the brake-valve, three holes $1^a$ $2^a$ $3^a$ passing through the intervening web 63, so that in any position except lap and emergency air in this large cavity may pass through one of the said holes and the port 34 to the equalizing-reservoir and train-line, and in full release the said cavity connects the main reservoir and train-line, while in emergency it travels far enough in the opposite direction to connect the train-line and direct or emergency exhaust, as usual in the Westinghouse brake-valve above mentioned. The exhaust grooves or cavities 60 and $60^a$ in the rotary-valve face coöperate with the exhaust groove and port of the rotary seat and with the equalizing-port 32. The grooves 60 and $60^a$ are separated in order to prevent connection of the emergency-port 39 with the atmosphere by way of the groove 61 when a service reduction is made. Otherwise if these grooves were continuous when a reduction was made air would not only flow out of the port 41, but also along the groove to the emergency-port, and as the time of reduction is gaged by the size of the port 41 it will be seen that this timing could not be effected if air were to pass along the groove to the emergency-port. The part of the groove marked $60^a$ connects the port 32 with the nearest point of the groove 61 when the valve-handle is in service position, while part of the groove (marked 60) is far enough back so as not to register at all with the groove 61 or port 41; yet when the valve-handle is moved to emergency position it is necessary in order to bleed the equalizing-reservoir that the port 32 should still be connected with the atmosphere, which by this means will be accomplished, as the rotary valve will move far enough around that instead of the groove $60^a$ connecting the port 32 with the groove 61 the groove 60 will do this, so that the equalizing-reservoir will be exhausted by this means at the same time that the regulating or expansion reservoir is being exhausted by way of the passage 27, port 28, groove 26, groove 29, and port 41, air from both the equalizing-reservoir and the regulating-reservoir joining at the port 41 and reducing together.

The numeral 31ª indicates the usual warning-port to warn the engineer that the valve is in full release position to prevent overcharging of the train-line, for in this position the train-line and main reservoir are connected and the valve must be moved to running position.

When the train-pipe and auxiliaries are charged and the brakes in release, the rotary valve is on lap, and all the ports in the rotary seat are consequently blanked, so that the exhaust ceases and no escape of air can take place. If, therefore, there is a reduction in the train-pipe due to leakage therein, when an application is made by the engineer instead of the desired reduction there will be the further reduction due to such leakage, and such reduction will of course immediately manifest itself in the harder application of the brakes than that intended. As a consequence, in order to secure proper application the brakes must be released and reapplied, with the resulting objections already noted.

In the use of our invention we entirely overcome this objection by the provision of an attachment which will automatically and at all times maintain in the train-pipe pressure for a desired reduction, supplying the necessary pressure to keep such pressure at the proper point whenever any leakage occurs while the engineer's valve is on lap, and we effect this object by the use of a construction now to be described.

The numeral 1 indicates a chamber or valve-body, closed, preferably, at one end by a screw-cap 2 and at the other end by a screw-nut 3. This chamber is divided into two chambers 21 and 22 by a double diaphragm 12, held in position therein by upper and lower rings 15 and 16, the latter resting upon a web 23ª, provided with ports or passages 24, affording communication between the chamber 22 and the lower part of the diaphragm, while the upper ring is securely held in place by a retaining-ring 10, having extensions or lugs 9 on the lower edge of the screw-cap 2, or by such extensions or lugs projecting upwardly from the ring 10. On opposite sides of the diaphragm 12 are plates 13 and 14, the former having an upwardly-projecting stem 11, with its upper end guided in a recess 8 in the cap 2, while the latter is limited in its downward movement by the web 23ª and carries by screw-threaded engagement therewith a valve-stem 19, provided with two valves 17, adapted to seat against the valve-seats 18, formed in the web 65, constituting a chamber or passage 23 in communication with the main reservoir. Below the diaphragm and surrounding the chamber 23 is a chamber 22, which is in direct communication with the train-line through the connection 6, the pipe 58, (see Fig. 1,) and the train-line port 36, while the chamber 23 communicates directly with the main reservoir through the pipe or conduit 4, and the regulating-chamber 21 above the diaphragm is in communication with the rotary valve-seat 64 through the conduit 7, terminating in the connection 30, attached to the seat. This chamber 21 also communicates, through the conduit or pipe 5, with a reservoir 20, which merely forms an enlargement of the regulating-chamber, and also with the ordinary feed-valve 48 by means of the pipe 54 and the pipe 53, the latter terminating in a passage similarly numbered in the feed-valve structure, which passage 53 is in open communication with the train-pipe space below the port 51 of the feed-valve by means of the port 55 in said valve and port 55ª in the valve-seat, when the feed-valve is open, but is controlled by the movement of said valve, so as to close when the latter is closed. Therefore when the feed-valve is open, as shown in Fig. 3, the regulating-chamber 21 is in communication with the train-pipe.

It will thus be seen that the diaphragm 12 constitutes a movable abutment which is exposed to a regulated pressure on one side derived through the brake-valve mechanism and controlled thereby, while on the other side said diaphragm is exposed to train-line pressure derived from direct connection with said train-line.

The rotary connection 30 communicates with a reduction-port 28 in the rotary seat by a passage 27, these parts being added to the present structure, while a further groove 29 is formed in the rotary seat and communicates with the ordinary preliminary exhaust 61, from which leads an exhaust-port 41 to the atmosphere instead of leading into the exhaust-port 39, as in the standard valve.

In the rotary valve-face we form an additional groove 26, which is adapted to span the reduction-port 28 and the exhaust-groove 29, so that when any reduction is made by the engineer the reduction in the chamber 21 will be in exact proportion thereto, and this groove 26, it should be observed, is of such length that it will span the reduction-port 28 and exhaust-groove 29 in emergency as well as in service applications.

From the foregoing description it will be seen that when the engineer makes a reduction from the equalizing-reservoir a like reduction must necessarily take place in the regulating-chamber 21 above the diaphragm 12 through the port 7 and rotary connection 30, passages 27, reduction-port 28, exhaust-groove 26, exhaust-groove 29, into the groove 61, thence out through the exhaust-port 41 to the atmosphere, thus at the same time and in the same proportion as pressure is being reduced from the equalizing-reservoir by way of the port 32, grooves 60 and 61, and port 41, such reduction being necessarily in exact proportion to that made in the train-line, and as the chamber 22 is in direct communication with the train-line the pressure on both sides of the diaphragm will be the same, and therefore when the brake-valve is lapped and exhaust ceases the pressure on opposite sides of the diaphragm will remain the same, as all the ports in the brake-valve are blanked and no air can escape from the chamber 21; but as the chamber 22 is subject to the same leakage as the train-line the instant there is any reduction in the train-line due to leakage the pressure in the chamber 22 is lowered, and the diaphragm is consequently moved by the greater pressure above the same in the chamber 21, with the result that the valve 17 is opened and fluid under pressure from the main reservoir is admitted at once into the chamber 22, thence into the train-line, with the result that the train-line pressure is restored to or maintained at that desired and intended by the engineer—namely, that in the chamber 21—the valves 17 being closed as soon as such restoration of pressure is effected, which will always occur before there can be any reduction sufficient to apply the brakes harder than intended by the engineer. As the port 55 communicates through port 55ª with the train-pipe space and is controlled by the movement of the feed-valve, it is obvious that air can enter the chamber 21 via the conduit 53 only when the feed-valve is open, and consequently the chamber 21 can never be charged beyond the pressure for which the regulating-valve or train-line governor is set, and the expansion-reservoir 20 affords sufficient space for the accommodation of the requisite volume of air to the chamber 21, acting in this respect in a similar manner to the equalizing-reservoir. If the engineer makes another reduction, the chamber 21 will also reduce as before and the train-line will again be maintained at the desired pressure despite any leaks in the train-line.

When an emergency application is made, as the groove 26 continues to register with the port 28 and groove 29 it will be evident from the foregoing that the chamber 21 will be exhausted of all its pressure, which is a necessary function in order to prevent the opening of the valves 17, because when such emergency application is made there is a greater reduction in the train-line, which necessarily reduces to a corresponding degree the pressure in the chamber 22, and therefore the reduction of pressure in the latter chamber will occur at the same time with and to the same extent as the reduction of pressure in the chamber 21.

The ports of the rotary valve and the rotary seat register as follows in the various positions of the valve:

Full release: The port 59 registers with the large cavity in the rotary seat, so that air passes under the bridge between the port 59 and cavity 62 in the rotary valve, which latter cavity registers with the train-line port 40, thus passing air direct to the train-line, and the hole 1ª in the web 63 on the under side of the cavity 62 registers with the port 34 in the rotary seat, thereby connecting with the equalizing-reservoir, while the port 56 registers with the port 32, also connecting with the equalizing-reservoir. In this position the warning-port 31ª connects with the port 39, thereby allowing escape to the atmosphere to warn the engineer against leaving the valve in this position too long.

Running position: The port 56 registers with the port 33, thus communicating, through the feed-valve, with the train-line, and as part of the cavity 62 still overlaps the port 40 they are still in register in this position, while the hole 3ª in the web 63 of the cavity 62 registers with the port 34, thus supplying equalizing-reservoir by way of the port 56, port 33, feed-valve port 40, cavity 62, hole 3ª, and port 34.

In lap position: All ports are blanked.

Service position: The groove 60ª laps over the port 32, reaching to the groove 61, giving exhaust to the atmosphere by way of the port 41, while the groove 26 laps over the port 28 and connects with the groove 29, thence to port 41 and atmosphere, all of which ports are of course blanked when the handle is moved back to lap position.

Emergency position: In this position the cavity 62 connects the port 40 and port 39, thereby opening direct communication with the atmosphere, while the groove 60 laps over the port 32 and connects it with the groove 61, thence through the port 41 to the atmosphere, and the groove 26 continues to lap over the port 28 and connects it with the groove 29, thence with the port 41 and the atmosphere. The hole 2ª in the web 63 of the cavity 62 registers with the port 34 when the valve is part way between full-release and running position, so as to insure the supply of air to the equalizing-reservoir.

We claim as our invention—

1. In a fluid-pressure brake, the combination with the main reservoir, engineer's brake-valve and train-pipe, of valve mechanism operated by the opposing pressures of the train-pipe and a regulating-chamber for controlling the supply of air from the main reservoir to the train-pipe when the brakes are applied, said brake-valve having a port for controlling the outlet from the regulating-chamber, and means for limiting the pressure of the regulating-chamber to the standard degree of train-pipe pressure.

2. In a fluid-pressure brake, the combination with a main reservoir, train-pipe and engineer's brake-valve, of a regulating-chamber, a valve operated by the opposing pressures of the train-pipe and regulating-chamber for controlling the supply of air to the train-pipe, a feed-valve for limiting the train-pipe pressure, and an inlet-port governed by the feed-valve for said regulating-chamber.

3. In a fluid-pressure brake, the combination with a main reservoir, train-pipe and engineer's brake-valve having an equalizing-reservoir and train-pipe discharge-valve operated by the opposing pressures of the said reservoir and the train-pipe, of a regulating-chamber and a valve governed by the pressure of said regulating-chamber for supplying air to the train-pipe, said brake-valve having ports for controlling the outlet from both the equalizing-reservoir and regulating-chamber.

4. In a fluid-pressure brake, the combination with a main reservoir, train-pipe and engineer's brake-valve having an equalizing-reservoir and a train-pipe discharge-valve governed by the pressure of said reservoir, of a regulating-chamber and a valve governed by the pressure therein for supplying air from the main reservoir to the train-pipe, a feed-valve for limiting the train-pipe pressure and a port controlled by said feed-valve for supplying air to said regulating-chamber.

5. In a fluid-pressure brake, the combination with a main reservoir, train-pipe and engineer's brake-valve having an equalizing-reservoir and train-pipe discharge-valve operated by the opposing pressures of the said reservoir and the train-pipe, of a regulating-chamber and a valve governed by the pressure of said regulating-chamber for supplying air to the train-pipe, said brake-valve having ports for controlling the outlet from both the equalizing-reservoir and regulating-chamber, and a feed-valve for supplying air from the main reservoir to both the train-pipe and said regulating-chamber.

6. In a fluid-pressure brake, the combination with a main reservoir, train-pipe and engineer's brake-valve having a train-pipe discharge-valve operated by fluid-pressure, of a regulating-chamber, a valve governed by the pressure therein for supplying air from the main reservoir to the train-pipe when the brakes are applied, and means for reducing the pressure in the regulating-chamber when the brake-valve is in service position.

7. In a fluid-pressure railway-brake mechanism, the combination with the engineer's brake-valve mechanism, and the main reservoir, of a casing having a movable abutment therein dividing said casing into two chambers, a connection between the exhaust-ports of the rotary seat of the brake-valve and one of the chambers, whereby it is subject to the same reductions as the train-line through said brake-valve mechanism, a connection between said chamber and the train-line feed ports and passages of the brake-valve mechanism for maintaining the same pressure therein as in the train-line through said valve mechanism, a connection between the train-line and the other chamber independent of the brake-valve connection, a connection between said chamber and main reservoir, and a valve controlling said connection actuated by the abutment when the train-line pressure reduces while the engineer's valve is on lap, whereby the desired reduction in the train-line for any particular application is assured, substantially as described.

8. In a fluid-pressure railway-brake mechanism, the combination with the main reservoir, the engineer's valve and the feed-valve mechanism coöperating therewith, of a casing, a movable abutment dividing said casing into two chambers, a conduit connecting one of the chambers with the feed-chamber of said feed-valve, and controlled by said valve, a conduit also connecting the said chamber with the exhaust of the brake-valve, a conduit connecting the other chamber of said casing with the train-line, a conduit also connecting said chamber with the main reservoir, and a valve in said conduit normally closing the same and adapted to be actuated by the abutment when the train-line pressure reduces from any cause below that intended for any application while the engineer's valve is on lap, substantially as described.

9. In a fluid-pressure railway-brake mechanism, the combination with the main reservoir and the engineer's valve mechanism, of a casing, a movable abutment therein dividing said casing into two chambers, one connected to the exhaust of the rotary valve and to the regulated train-line feed thereof, whereby the pressure therein will always be maintained the same as that produced in the train-line through the engineer's valve, the other chamber connected to the train-line independent of said engineer's valve, whereby variations in the train-line at all times will be transmitted to said chamber, a conduit connecting the main reservoir with the train-line, and a valve operated by said movable abutment to open said conduit for admission of main-reservoir pressure to the train-line when train-line pressure is reduced while the engineer's valve is on lap, substantially as described.

10. In a fluid-pressure railway-brake mechanism, the combination with the main reservoir and the engineer's brake-valve mechanism comprising the usual rotary valve and seat, of a casing having a movable abutment therein open on one side to a passage terminating in a reduction-port in the rotary seat, a groove connected to a preliminary exhaust groove or cavity of the seat, a groove or cavity in the rotary valve adapted to span the reduction-port and the said exhaust-groove in all applications, whereby said side of the abutment is subject to the same reduction as the train-line through the brake-valve mechanism, a conduit from the train-line feed of the brake-valve admitting the same train-line pressure to said side of the abutment, a conduit leading from the train-line direct for admitting train-line pressure to the opposite side of said abutment, a conduit connecting the main reservoir with the train-line, and a valve in said conduit controlled by the abutment for permitting main-reservoir pressure to enter the train-line when the pressure in the latter falls below that maintained on the brake-valve side of said abutment, substantially as described.

11. In an engineer's brake-valve attachment, the combination with the brake-valve and application feed-valve, of a casing having a movable abutment, one side of which is exposed to direct train-line pressure, a conduit leading from the other side of said abutment to the application feed-valve and terminating in a port controlled by the movements of said feed-valve, whereby train-line pressure controlled by the engineer's valve and the feed-valve is admitted to one side of the abutment and direct train-line pressure to the other side thereof, substantially as described.

12. In an engineer's brake-valve attachment, the combination with the brake-valve and the application slide-valve feed-valve, of a casing having a movable abutment therein exposed on one side to direct train-line pressure, a conduit connecting the other side of said abutment with the feed-valve structure and terminating in a port in the valve-seat, a port in the slide-valve registering therewith when pressure flows through the feed-valve to the train-line and closed by the said feed-valve when it moves to cut off the pressure at a predetermined amount, whereby train-line pressure controlled by the brake-valve and the feed-valve is maintained on one side of the abutment and direct train-line pressure on the other side thereof, substantially as described.

In testimony whereof we have signed our names to this specification in the presence of the subscribing witnesses.

WALTER V. TURNER.
DAVID M. LEWIS.

Witnesses:
   CHAS. E. GOYER,
   J. F. WHITE,
   T. F. RANDOLPH,
   J. LEMSTRA.